(12) United States Patent
Bhagwan et al.

(10) Patent No.: US 9,922,129 B2
(45) Date of Patent: Mar. 20, 2018

(54) SYSTEMS AND METHODS FOR CLUSTER AUGMENTATION OF SEARCH RESULTS

(75) Inventors: Varun Bhagwan, San Jose, CA (US); Rajesh M. Desai, San Jose, CA (US); Jeffrey Alan Kusnitz, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 1341 days.

(21) Appl. No.: 12/890,976

(22) Filed: Sep. 27, 2010

(65) Prior Publication Data

US 2012/0078719 A1    Mar. 29, 2012

(51) Int. Cl.
*G06Q 30/00* (2012.01)
*G06F 17/30* (2006.01)
*G06Q 30/02* (2012.01)

(52) U.S. Cl.
CPC ... *G06F 17/30882* (2013.01); *G06Q 30/0241* (2013.01); *G06Q 30/0256* (2013.01)

(58) Field of Classification Search
USPC ............ 705/14.49, 14.54, 14.55, 14.66, 14.4
See application file for complete search history.

(56) References Cited

U.S. PATENT DOCUMENTS

| | | | | |
|---|---|---|---|---|
| 2004/0059708 A1* | 3/2004 | Dean | ...................... | G06Q 30/02 |
| 2005/0144158 A1* | 6/2005 | Capper | ............. | G06F 17/30696 |
| 2006/0242013 A1* | 10/2006 | Agarwal | ................ | G06Q 30/02 |
| | | | | 705/14.49 |
| 2008/0162260 A1* | 7/2008 | Rohan et al. | ..................... | 705/10 |
| 2008/0168052 A1* | 7/2008 | Ott | ..................... | G06F 17/30864 |
| 2008/0288596 A1* | 11/2008 | Smith et al. | .................. | 709/206 |
| 2009/0070366 A1* | 3/2009 | Zhao et al. | .................... | 707/102 |
| 2010/0082618 A1* | 4/2010 | Ott, IV | ............. | G06F 17/30864 |
| | | | | 707/730 |
| 2010/0114938 A1* | 5/2010 | Weng | ................ | G06F 17/30867 |
| | | | | 707/769 |
| 2010/0205541 A1* | 8/2010 | Rapaport | ............... | G06Q 10/10 |
| | | | | 715/753 |
| 2010/0262576 A1* | 10/2010 | Stockwell | ........... | G06F 17/2785 |
| | | | | 706/55 |
| 2011/0010384 A1* | 1/2011 | Luo | ........................ | G06Q 10/10 |
| | | | | 707/769 |
| 2011/0022621 A1* | 1/2011 | Luo | ........................ | G06Q 30/02 |
| | | | | 707/769 |
| 2011/0145160 A1* | 6/2011 | Hajiaghayi | ...... | G06Q 10/06395 |
| | | | | 705/319 |

(Continued)

*Primary Examiner* — Luis A Brown
(74) *Attorney, Agent, or Firm* — Ference & Associates LLC

(57) ABSTRACT

Systems and associated methods for clustering a plurality of nodes based on connectivity among the plurality of nodes, determining relevant content of the clusters, and applying knowledge regarding the relevant content are described. The nodes can include for example web-based documents such as web pages. The clusters can include for example groups of web pages that are linked together, as via hyperlinks. The relevant content can include one or more topics associated with the web page, as for example determined via text mining. Applying the knowledge regarding the relevant content can include for example using the one or more topics associated with the web pages to augment search results and/or conduct contextual advertising.

18 Claims, 9 Drawing Sheets

(56) References Cited

U.S. PATENT DOCUMENTS

| | | | |
|---|---|---|---|
| 2011/0179078 A1* | 7/2011 | Boerries | G06F 17/30864 707/770 |
| 2011/0307425 A1* | 12/2011 | Wang et al. | 706/12 |
| 2012/0078719 A1* | 3/2012 | Bhagwan | G06F 17/30882 705/14.54 |
| 2012/0191776 A1* | 7/2012 | Ruffner | G06F 17/30873 709/204 |
| 2012/0254186 A1* | 10/2012 | Winner | G06F 17/30241 707/740 |
| 2013/0031079 A1* | 1/2013 | El Daher | G06F 17/30867 707/706 |
| 2013/0031080 A1* | 1/2013 | Vijaywargi | G06F 17/30887 707/706 |
| 2013/0041876 A1* | 2/2013 | Dow | G06F 17/30867 707/706 |

* cited by examiner

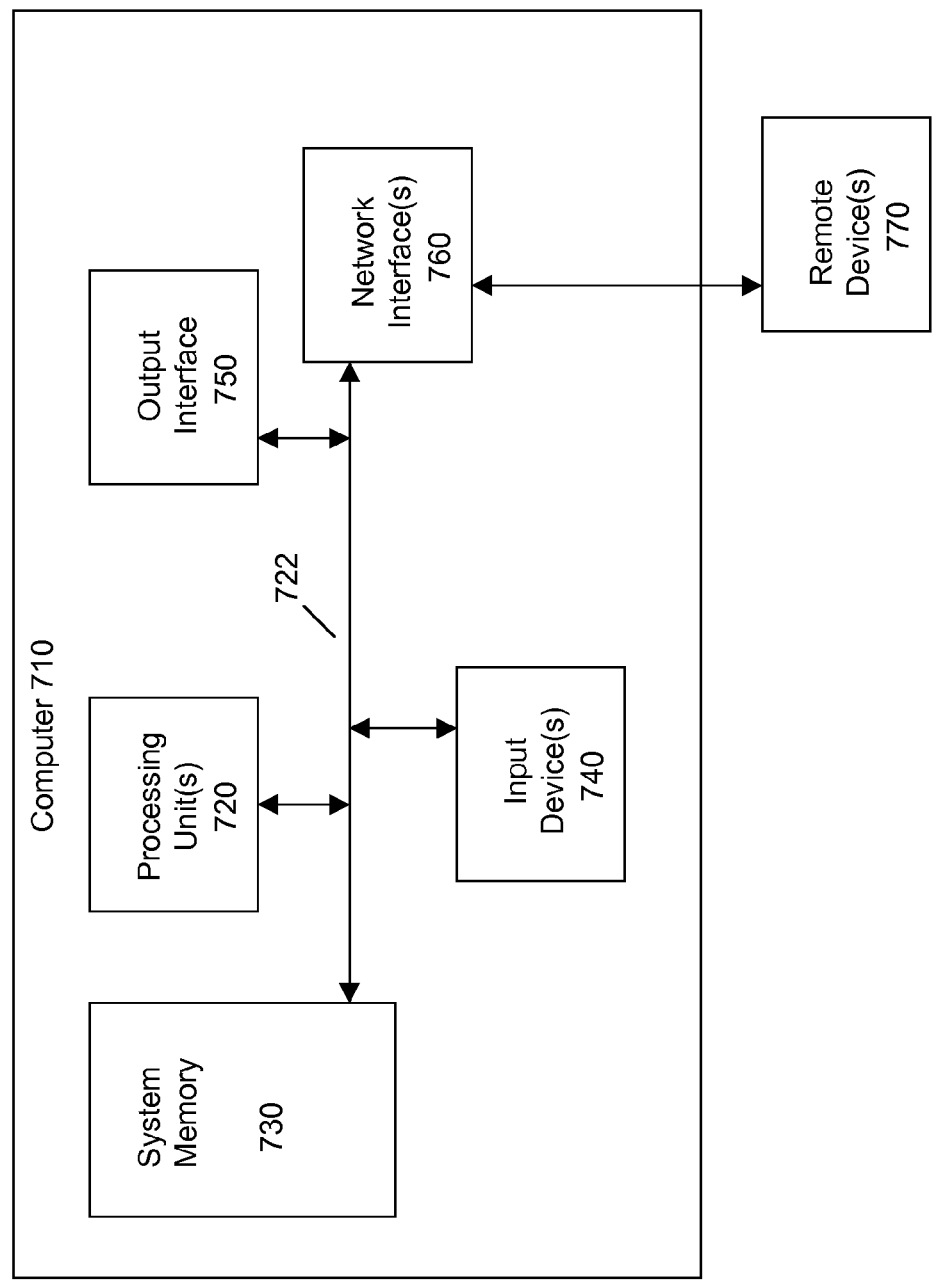

SYSTEMS AND METHODS FOR CLUSTER AUGMENTATION OF SEARCH RESULTS

BACKGROUND

The subject matter described herein generally relates to online advertising. Advertisements ("ads") are a means of significant revenue generation in the online world. The current means of placing advertisements on web pages range from a simple broadcast, to random-sampling, to analyzing the content on a given web page or web site and selecting a relevant advertisement (for example, via matching keywords). Unfortunately, for targeted advertisements, current methods are unsatisfactory for a variety of reasons.

BRIEF SUMMARY

Systems and associated methods for clustering a plurality of nodes based on connectivity among the plurality of nodes, determining relevant content of the clusters, and applying knowledge regarding the relevant content are described. The nodes can include for example web-based documents such as web pages, connected via hyperlinks. The clusters can include for example groups of web pages that are linked together or connected. The relevant content can include one or more topics associated with the web page, as for example determined via text mining. Applying the knowledge regarding the relevant content can include for example using the one or more topics associated with the clusters to augment search results and/or conduct contextual/targeted advertising.

In summary, one aspect provides a method for cluster augmentation of search results comprising: receiving a query including one or more search terms; clustering a plurality of nodes to form one or more clusters based on connectivity among the plurality of nodes within a network; determining one or more key terms for the one or more clusters; and returning one or more results including one or more clusters having one or more key terms corresponding to the one or more search terms.

Another aspect provides a computer program product for cluster augmentation of search results comprising: a computer readable storage medium having computer readable program code embodied therewith, the computer readable program code comprising: computer readable program code configured to, responsive to receiving a query including one or more search terms, cluster a plurality of nodes to form one or more clusters based on connectivity among the plurality of nodes within a network; computer readable program code configured to determine one or more key terms for the one or more clusters; and computer readable program code configured to return one or more results including one or more clusters having one or more key terms corresponding to the one or more search terms.

A further aspect provides a system for cluster augmentation of search results comprising: one or more processors; and a memory operatively connected to the one or more processors; wherein, responsive to execution of computer readable program code accessible to the one or more processors, the one or more processors are configured to: receive a query including one or more search terms; cluster a plurality of nodes to form one or more clusters based on connectivity among the plurality of nodes within a network; determine one or more key terms for the one or more clusters; and return one or more results including one or more clusters having one or more key terms corresponding to the one or more search terms.

The foregoing is a summary and thus may contain simplifications, generalizations, and omissions of detail; consequently, those skilled in the art will appreciate that the summary is illustrative only and is not intended to be in any way limiting. For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 7 illustrates an example computer system.

DETAILED DESCRIPTION

Figure 1:
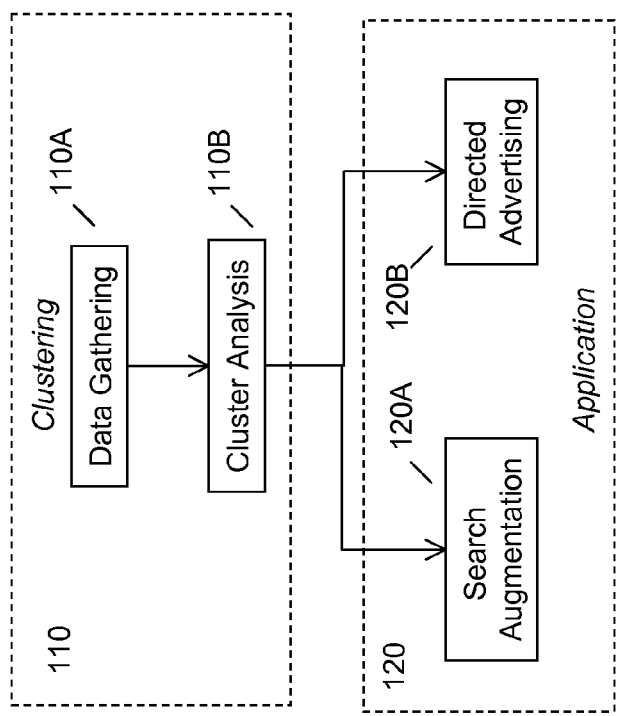
FIG. 1 illustrates an example overview of clustering and application functionality.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of certain example embodiments.

Reference throughout this specification to "embodiment(s)" means that a particular feature, structure, or characteristic described in connection with the embodiment is included in at least one embodiment. Thus, the appearances of "embodiment(s)" in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that aspects can be practiced without one or more of the specific details, or with other methods, components, materials, et cetera. In other instances, well-known structures, materials, or operations are not shown or described in detail to avoid obfuscation.

As described herein, while various schemes have been implemented for online advertising, each has shortcomings. For targeted ads, current methods fail to take into account the context surrounding a web page with respect to connectivity. For example, which pages link to the web page the advertisement is to be displayed upon, which web pages that web page links to, and so on.

Broadcast-based advertising may work reasonably well if the advertiser has a large advertising budget, but it is inherently inefficient. Random sampling is a hit-or-miss approach, in that a part of the target audience will see the advertisements with a large enough coverage, but many more will get annoyed by irrelevant or inappropriate advertising. Random sampling is thus also quite inefficient, and it suffers due to challenges associated with generating a truly random sample, which if not accomplished, can result in skew.

While content analysis of a web page provides some indication of the topics of interest for that web page, and is therefore more suitable for targeted advertisements, it is extremely localized in nature and has a very narrow scope. There also exist models for different types of advertisements (for example, banner advertisements, pop-up advertisements, floating advertisements, et cetera), but the embodiments described herein are agnostic to those models. Instead, embodiments pertain to the content of an advertisement and on which web page(s) it is displayed. In particular, embodiments analyze not just the web page that an advertisement will appear on, but also those web pages that are linked to and from it.

Embodiments therefore present a mechanism to add categorization and clustering to online communities in order to enable directed advertising of products to these communities. A "community", as used herein, takes the meaning of a grouping or cluster of documents, such as web pages, that are linked together in a network, for example web pages that are explicitly linked via one or more hyperlinks. A "node", as used herein, takes the meaning of a document belonging to a community, for example a node may be a web page.

It should be noted that embodiments particularly differ from typical contextual/directed advertising in that typical contextual advertisements are limited to a single web page or a single web site. The conventional textual advertisements also tend to target the individual visiting the web site or the web site itself, whereas embodiments target the community encompassing the web site being visited (for example, "this web page" and all web pages "linked" to it within the given community).

Embodiments also differ from the concept of Hubs and Authorities, as described in further detail herein, since Hubs and Authorities are simply the most prominent sources for content on specific topics. In Hubs and Authorities, hubs are gatekeepers that point to authoritative sites; whereas authorities are nodes/sites that that are pointed to (that is, deemed to be authoritative) by hubs. See http://en.wikipedia.org/wiki/HITS_algorithm; see also http://en.wikipedia.org/wiki/Hubs_and_authorities, both of which are incorporated by reference here. In fact, embodiments remove hubs and authorities according to a user defined connectivity factor, which enables determination of many different sizes of clusters.

Thus, embodiments introduce a unique mechanism of creating clusters of configurable size based on the connectivity density of the underlying network/graph of nodes, and determining the top-level contexts/topics associated with that particular community or cluster of nodes. Determining the set of contexts associated with a cluster enables advertisers to spend their advertising budget in a much more targeted/directed manner by focusing on entire communities that are likely to be interested in their products.

Referring to FIG. 1, for easier understanding and description, embodiments may be thought of as providing two core functions, namely Clustering 110 and Application 120. For its part, Clustering 110 can be further broken down into the parts of Data Gathering 110A and Cluster Analysis 110B, while Application 120 can be further expanded into Search Augmentation 120A and Directed/targeted Advertising 120B. Each is described in turn, with illustrative and non-limiting examples used throughout.

Clustering

Clustering 110 includes data gathering 110A and cluster analysis 110B. While not strictly related to clustering 110, data gathering 110A or collection is a step in the clustering process. In the data gathering 110A or collection phase, data is collected from different sources.

Figure 2:
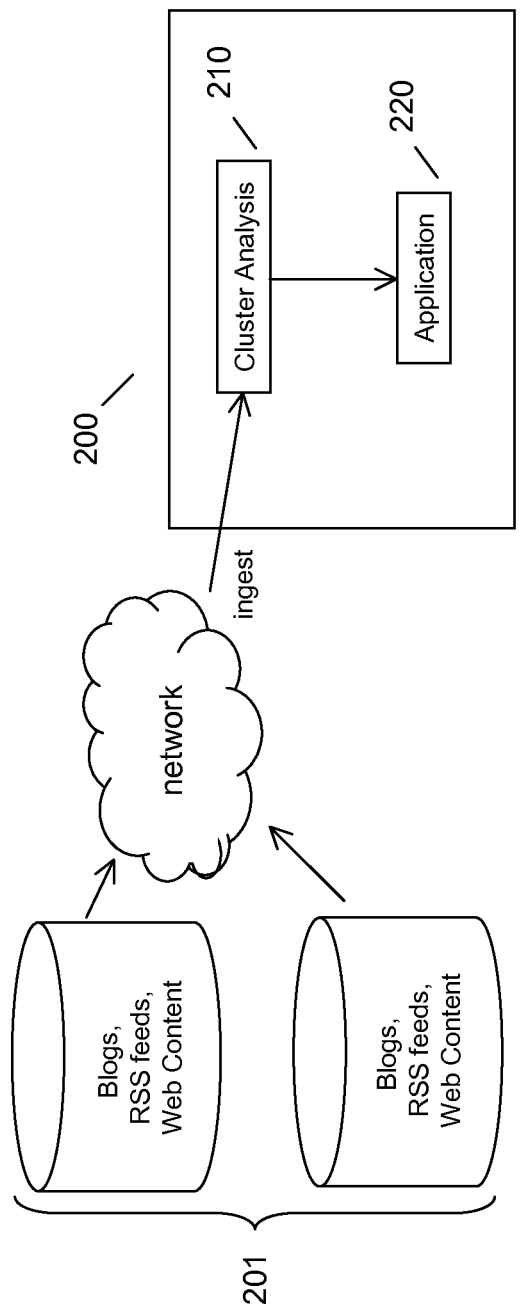
FIG. 2 illustrates an example system for clustering and application functionality.

Referring to FIG. 2, sources 201 of data can include for example web pages such as blogs or social-networking sites, or even enterprise data (including enterprise blogs, web pages, chats, et cetera). This data collection is done by any of a variety of traditional means (for example, via web crawlers). For example, a system 200 ingests structured and/or unstructured content from many sources 201, such as blogs, Really Simple Syndication (RSS) feeds, and web pages. Once the data has been captured, the system 200 performs cluster analysis 210 and application 220, as further described herein.

The system 200 assimilates the gathered data collected in the data gathering 110A or collection phase and forms multiple clusters/communities on a connectivity basis as part of the cluster analysis phase 110B. One aspect of the various embodiments is the configurable size of the communities formed. For each cluster/community formed, embodiments generate the top themes or topics and/or key-words/terms/phrases associated with the community. A further step enables generation of the top taxonomic nodes (for example, web pages) associated with each cluster. Once the above data gathering 110A and cluster analysis 110B processes have completed, embodiments use the outcome for the application phase 120, such as search augmentation 120A and directed advertising 120B.

Figure 3:
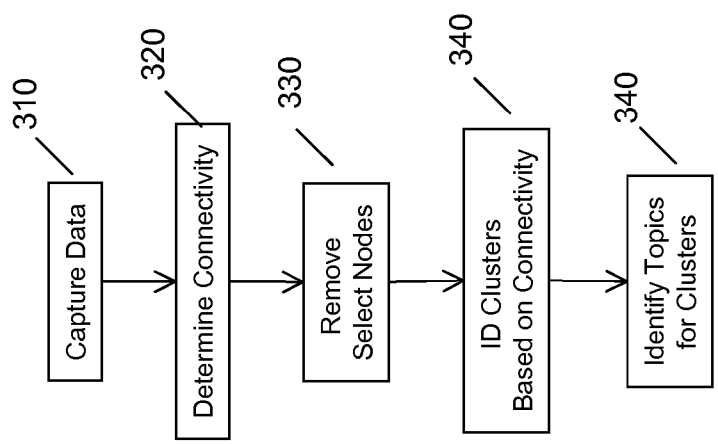
FIG. 3 illustrates an example method for determining clusters and analysis thereof.

FIG. 3 illustrates an example method for clustering. Embodiments cluster nodes of a network, such as a plurality of linked web pages throughout the Internet, to form communities based on node connectivity. As data is captured or ingested 310, embodiments determine connectivity based on the linkages between the nodes. Linkage information is contained in the ingested data. Once the connectivity determined 320, embodiments remove Hubs and Authorities 330 based on a user definable connectivity factor to identify clusters 340 of an appropriate size based on the connectivity of the remaining nodes. By analyzing contents of the nodes, such as extracted text of web pages (using any of a variety of known methods, for example term frequency-inverse document frequency (tf-idf)), embodiments can identify the top themes or topics and/or key-words/terms/phrases of a cluster.

For example, a cluster/community may include a plurality of linked web pages potentially referencing a particular topic, such as cellular telephones. Thus, cellular telephones can be identified as a topic for this particular community/cluster of connected web pages. The top themes or topics and/or key-words/terms/phrases can be used as key words to return a given cluster responsive to an input keyword search, as via a web browser. As described further herein, embodiments allow for modulation of the size/scale of clusters based on modulating the degree of connectivity desired, and given the knowledge regarding the top themes or topics and/or key-words/terms/phrases of the clusters, this enables advertisers to target specific communities with varying granularity.

Any of a variety of existing mining techniques can determine the statistically relevant elements of the data (from a plurality of nodes) once the data has been captured. For example, a text-mining technique can be employed to determine statistically relevant keyword(s), phrases and concepts in a corpus of web pages. The determination of relevant keywords can be augmented through a taxonomy or rule-based spotting mechanism. The relevant keywords, phrases and concepts will determine the topic(s) of each node. Each node (web page, blog posting, et cetera) will have a number of outlinks to other elements in the data corpus, which can be determined. This will generate a set of {topic, relevance, outlink} tuples that can be used for connectivity analysis.

For each node, a connectivity context of the node is generated. For example, the connectivity context can include the following features: sorted outlinks; relevance or authoritative-based weighted outlinks (inlinks and outlinks can be weighted differently, for example, authoritative pages are pages that have a significant number of inlinks, it is these inlinks that make these pages authoritative); and number of outlinks.

Assuming the set of features for each cluster is an ordered list, a shingle (fingerprint/feature vector) is generated for that list. Shingles can be ordered with the more important features being represented with higher order bits. The ordered shingle list will contain the similar looking shingles with a high locality of reference (for example, shingles that appear closer together in the list represent clusters that are more closely related). As various bits of the shingles are correlated to particular elements of the feature vector, ignoring some bits within the shingle and re-computing the list will result in different clusters being identified as being closely related. Once the system has collapsed the web space into clusters for which there are identified top themes or topics and/or key-words/terms/phrases, the topics that are relevant to the audiences within each cluster are identifiable.

Description of Networks

Figure 4A:
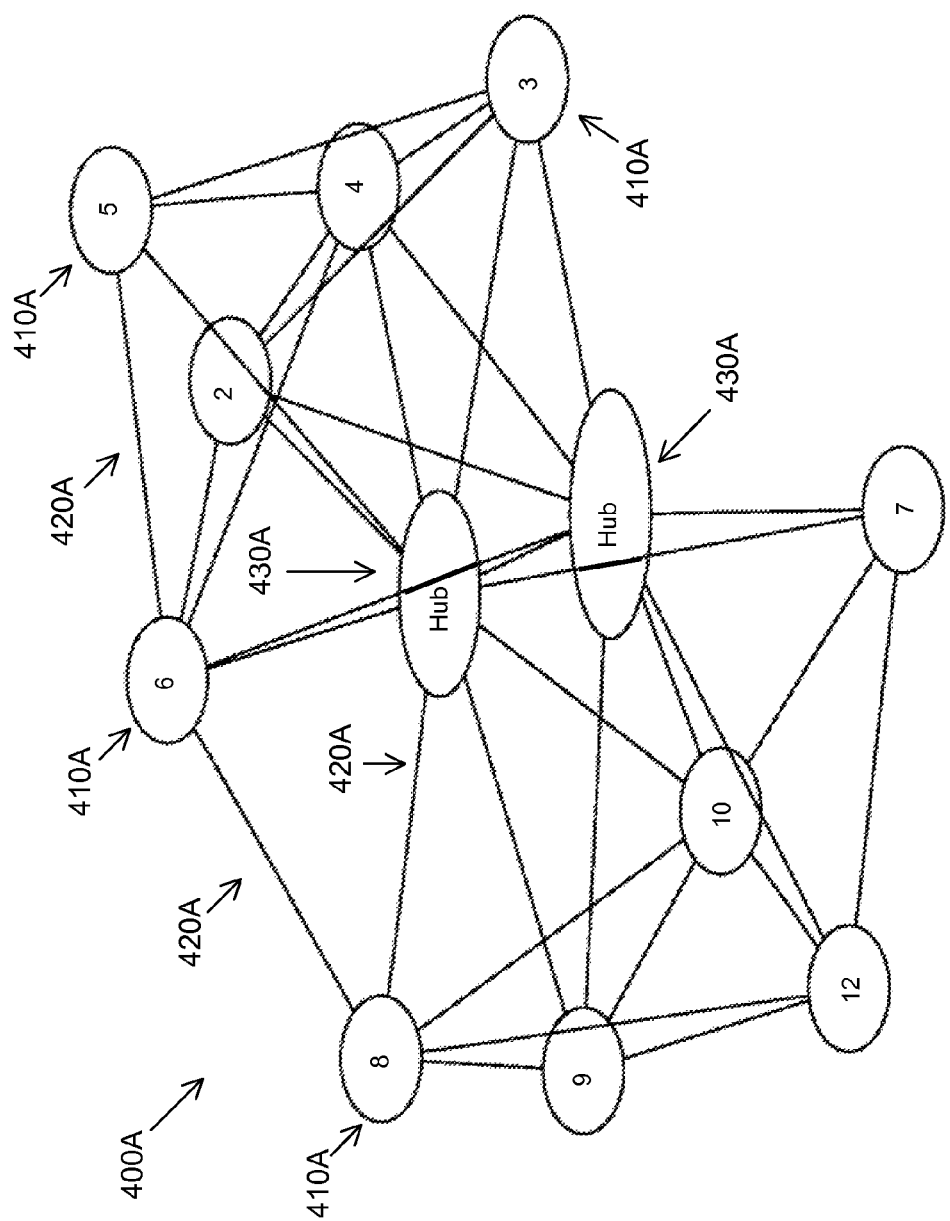
FIG. 4A illustrates an example network.

For clustering based on connectivity between nodes, a brief description of networks is instructive. FIG. 4A illustrates an example network, such as the Internet. The network 400A is comprised of a plurality of nodes 410A that are connected via a plurality of links 420A. Complex, real world networks have the following properties: a heavy-tail in the degree distribution, a high clustering coefficient, associativity or dissociativity among vertices, community structure at many scales, and evidence of a hierarchical structure. Embodiments find a community's structure at different scales, where the user can define the scale. A random network (that is, having a Poisson distribution) exhibits a high degree of similarity no matter which part of the network/graph is examined. In the real world (for example, with actual web collected data), however, the degree of similarity of network-connectivity varies tremendously; this property is exploited by embodiments.

Figure 5:
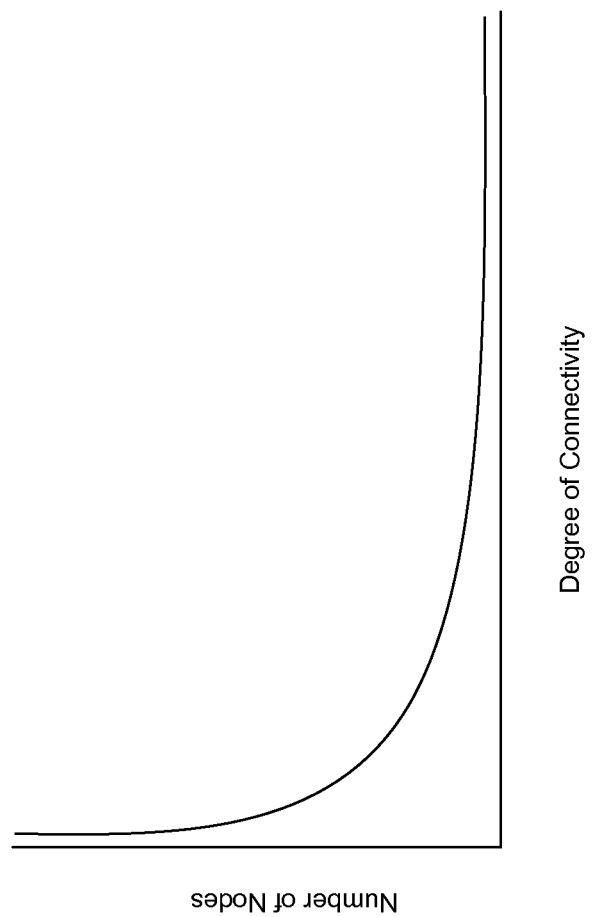
FIG. 5 illustrates a Power Law for connectivity among nodes in a network.

A network is scale-free if its degree distribution, that is the probability that a node selected uniformly at random has a certain number of links (degrees), follows a mathematical function called a Power Law. A Power Law, such as that illustrated in FIG. 5, implies that most vertices are sparsely connected, while a few vertices are intensively connected to many others and play an important role in functionality of the network. These vertices have a degree that is orders of magnitude larger than the average. Such vertices are often called "hubs" 430A.

In mathematical terms, a Power Law in the degree distribution:

$$PD(k)=1/k^{\tilde{a}}$$

in complex networks is an interesting self organized phenomenon in complex systems. Here, the degree of the graph (k) represents the number of edges incident upon a given vertex. The exponent ã is not universal and depends on the detail of network structure.

A Power Law degree distribution occurs in many real world networks such as: social networks (for example, email networks, MySpace® social network, LinkedIn® social network, et cetera), biological networks (protein interaction networks, neural networks), technological networks (computer network, World Wide Web, network of Internet routers), and epidemiological networks. MySpace® is a registered trademark of MySpace Inc. in the United States and other countries. LinkedIn® is a registered trademark of LinkedIn Corp. in the United States and other countries.

In the case of the random networks, if a critical fraction of nodes is removed, these graphs break into small, disconnected islands of sub-graphs. In contrast, the scale-free networks are very different, as many as 80 percent of randomly selected nodes can be removed and the remaining nodes will still form a compact cluster in which there will still be a path between any two nodes.

Networks with Power Law degree distribution can be highly resistant to the random deletion of vertices. That is, the vast majority of vertices remain connected together as a giant component (large cluster) after deletion of random vertices.

Such networks can also be quite sensitive to targeted attacks aimed at fracturing the network quickly. In short, if 99 percent of randomly selected nodes 410A are removed from the scale-free network 400A, the network 400A is still connected, but if 1 percent of targeted "hubs" 430A are removed from the network 400A, the network 410A breaks into small clusters. The 99 percent and 1 percent numbers will depend on the degree exponent.

The "hub" nodes 430A (the 1 percent referred to above) are the ones that attract the majority of the new links. This has been called the "winners take all" phenomenon. Such nodes 430A play a very important role when considered at the global level and taking the entire network 400A as one community. They also play a "spam" role by dominating the connectivity graph (for example, every page on the Internet is connected to www.google.com, but this is not an authority on every topic, and does not form part of a community).

Figure 4B:
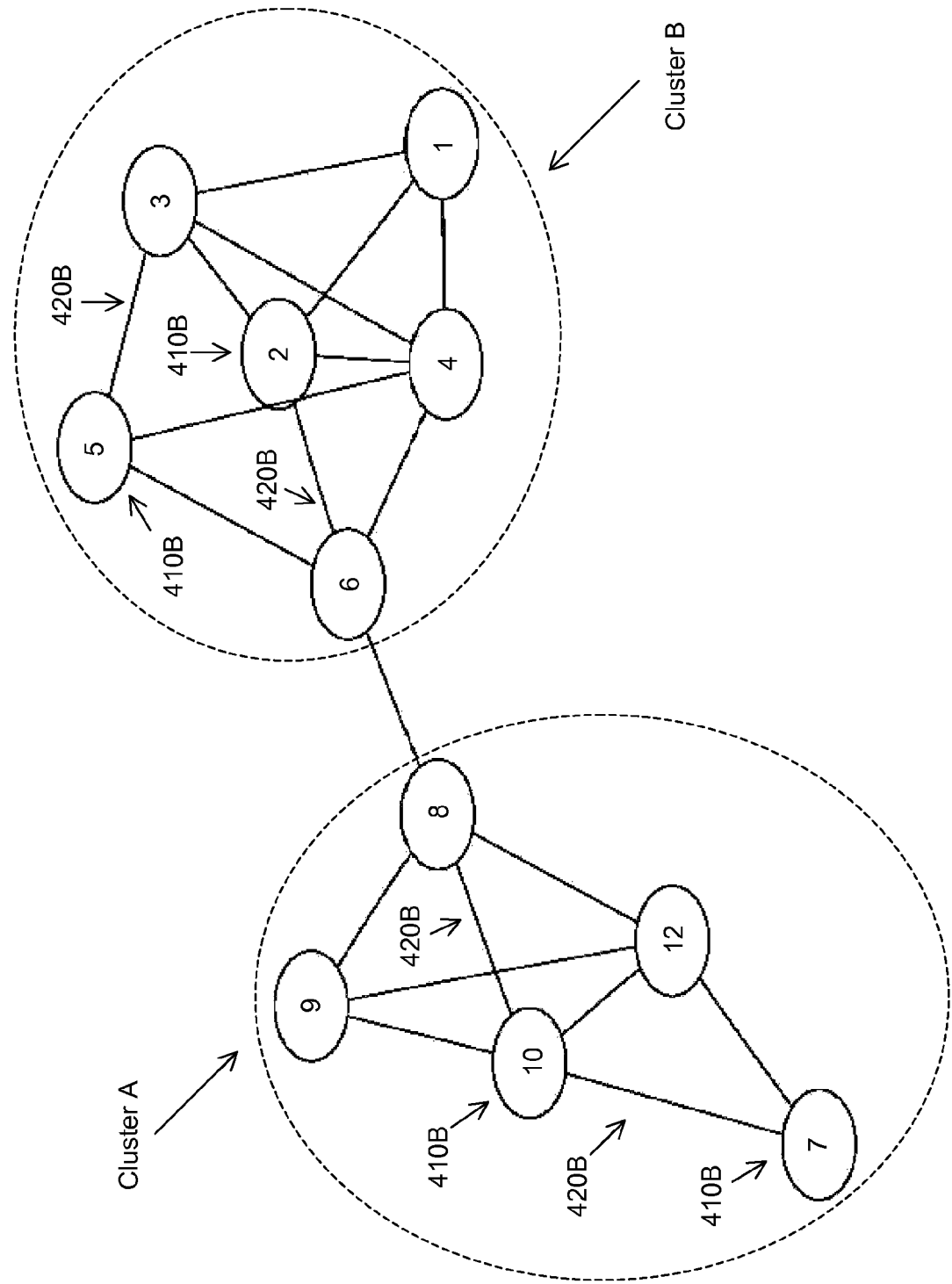
FIG. 4B illustrates two example clusters identified from a network.

As illustrated in FIG. 4B, embodiments use the above properties of the scale-free networks to quickly form communities by removing "hubs" 430A and forming clusters (for example, Clusters A and B) of varying sizes, each containing connected nodes. For example, by removing "hubs" 430A from network 400A, two clusters (A and B) are formed. Clusters A and B each contain a plurality of nodes 410B connected by links 420A, where the degree of connectivity between the nodes in the absence of the "hubs" 430A dictates the formation of two clusters.

As an example, an advertising consultant can choose a connectivity factor indicating a cutoff point for an amount of "hubs" 430A to be removed from or included in the graph. In extreme cases, the advertising consultant doesn't remove any "hubs" 430A and the network 400A will appear as a single community (one large cluster). This use case is used by search engine applications for the purpose of page ranking.

At the other extreme, the advertising consultant removes a large fraction of "hubs" 430A causing the graph to break into a number of very small sub-graphs or micro-communities. This is not optimal in many cases, as many sub-graphs will comprise of a single node, for example, a single web page. The advertising consultant can choose an intermediate connectivity factor between these extremes as a cut-off point, which gets translated to a percentage of hubs being removed from connectivity graphs. The sub-graphs formed, as the consequence of the above operation, will be clusters of nodes (communities) for the entire network.

No matter the exact choice of how many hubs and/or authorities to remove or keep, clusters of varying sizes can be used as communities for contextual advertising. As described herein, content analysis of the nodes making up the clusters informs which topic(s) are associated with which community. Once the topic(s) have been identified, advertising schemes targeted to particular communities can be designed, as described further herein.

Application

Figure 6A:
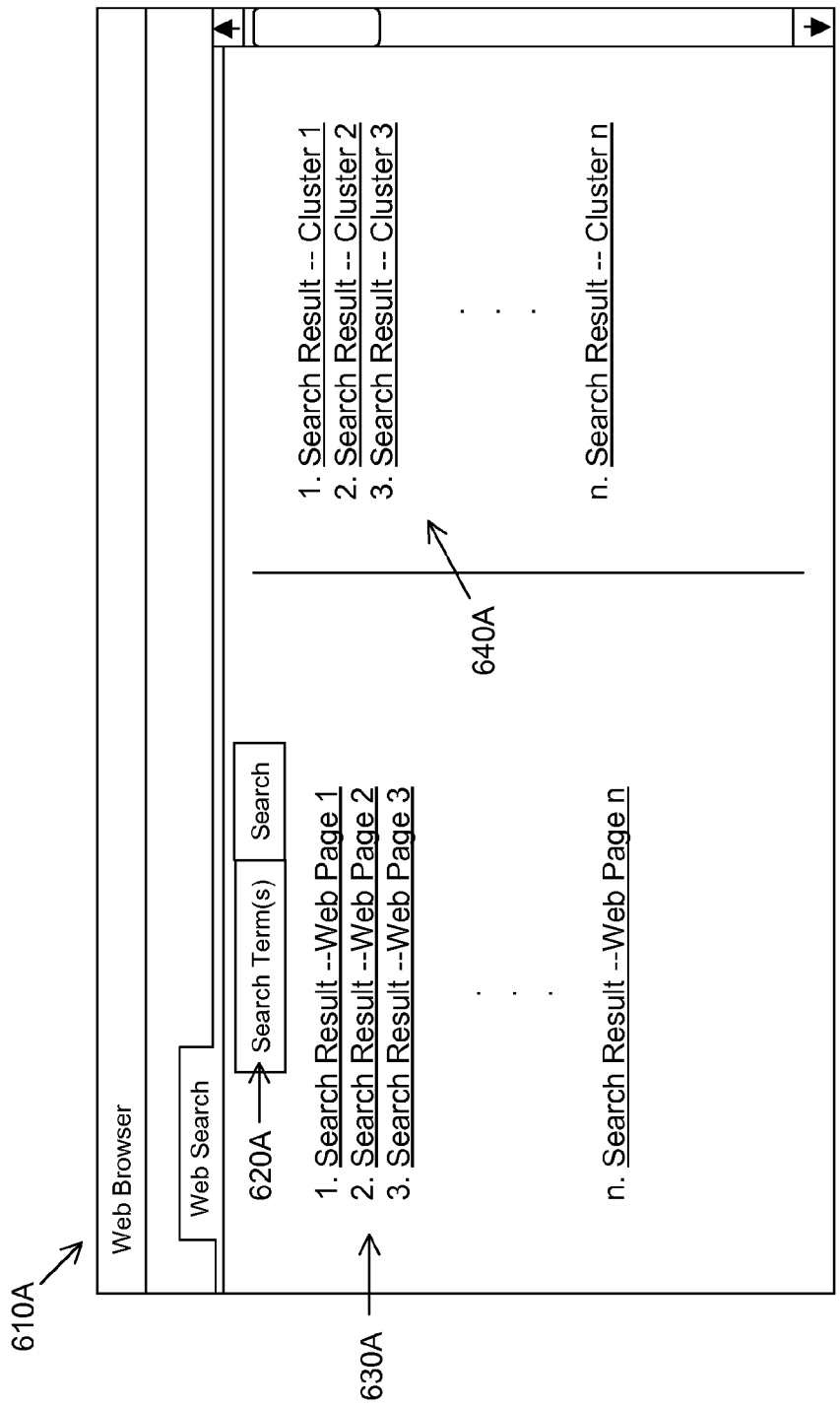
FIG. 6A illustrates an example of a combined search result.

As illustrated in FIG. 6A, embodiments augment the search results of a typical search engine by providing additional data based on the clustering described herein. Embodiments can achieve this in multiple ways. For example, embodiments can achieve this by adding the top clusters (with user-definable density) that match given search terms, by presenting clusters that span across pre-defined themes/taxonomy nodes to help the user disambiguate his or her search, and/or by enabling the user to dive into a relevant "community" that focuses on the information sought by the user, as in a faceted search.

Thus, embodiments enable a user to employ a web browser 610A to enter search term(s) 620A and conduct a search. The web browser 610A renders search results that can of course include conventional search results 630A, for example a list of ranked web pages. Moreover, embodiments provide cluster results 640A, which may be combined with the conventional search results 630A. The cluster results 640A can be rendered in a variety of ways, such as a list of relevant clusters ranked appropriately given the input search terms 620A. The clusters included in the cluster results 640A correspond to clusters having top themes or topics and/or key-words/terms/phrases matching the search term(s) 620A entered by the user. By clicking on a particular cluster, for example Cluster 1, a user is provided with a listing of nodes (such as web pages and snippets) included in that particular cluster. From there, the user can click to be redirected to a web page of interest.

Figure 6B:
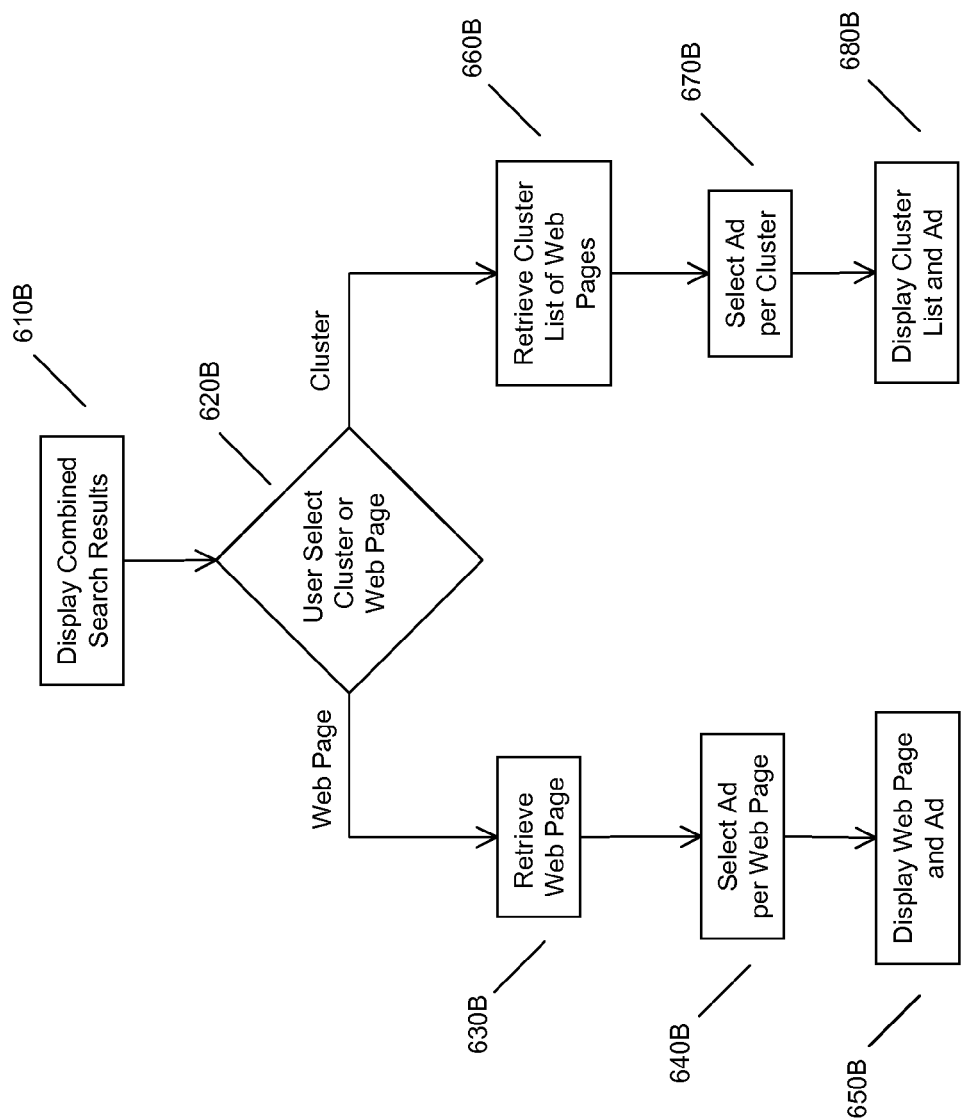
FIG. 6B illustrates an example method for advertising using clusters.

FIG. 6B illustrates an example method for advertising using clusters. A web browser 610A displays the combined search results 610B. If a user selects a web page 620B, the system retrieves the web page 630B and selects an advertisement per the web page selected 640B. The web page and advertisement can then be displayed 650B to the user. Moreover, if the user selects a cluster at 620B, the system retrieves the (top) list of web pages included in the cluster 660B. The system can also select one or more advertisements per the cluster selected 670B. The system then displays the cluster list along with the advertisement(s) 680B.

For directed advertising, embodiments pair up the advertisers and the clusters rich with relevant contextual information. This is done for example in the following steps. An advertising consultant selects the taxonomic nodes and/or search terms/phrases that match the product/service they wish to advertise. This process is similar to the Google ADWORDS® service where an advertiser "purchases" key-words from Google. The top clusters that match the selection are displayed to the advertising consultant, along with meta-information for each cluster. Meta information includes for example cluster size and density, and/or cluster age (how long has the cluster been around, what is the average age of the content within the cluster, and the like). The advertising consultant then selects the cluster(s) on which he or she wishes to display their advertisements. Thus, when a user chooses a particular cluster, the appropriate advertisement can be returned. ADWORDS® is a registered trademark of Google Inc. in the United States and other countries.

Referring to FIG. 7, it will be readily understood that embodiments can be implemented using any of a wide variety of devices or combinations of devices. An example device that may be used in implementing one or more embodiments includes a computing device in the form of a computer 710. In this regard, the computer 710 may execute program instructions configured to perform clustering, contextual advertising, and other functionality of the embodiments, as described herein.

Components of computer 710 may include, but are not limited to, processing units 720, a system memory 730, and a system bus 722 that couples various system components including the system memory 730 to the processing unit 720. Computer 710 may include or have access to a variety of computer readable media. The system memory 730 may include computer readable storage media in the form of volatile and/or nonvolatile memory such as read only memory (ROM) and/or random access memory (RAM). By way of example, and not limitation, system memory 730 may also include an operating system, application programs, other program modules, and program data.

A user can interface with (for example, enter commands and information) the computer 710 through input devices 740. A monitor or other type of device can also be connected to the system bus 722 via an interface, such as an output interface 750. In addition to a monitor, computers may also include other peripheral output devices. The computer 710 may operate in a networked or distributed environment using logical connections to one or more other remote computers or databases, such as servers hosting web pages. The logical connections may include a network, such as a local area network (LAN) or a wide area network (WAN), but may also include other networks/buses.

It should be noted as well that certain embodiments may be implemented as a system, method or computer program product. Accordingly, aspects of the invention may take the form of an entirely hardware embodiment, an entirely software embodiment (including firmware, resident software, micro-code, et cetera) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied therewith.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, et cetera, or any suitable combination of the foregoing.

Computer program code for carrying out operations for aspects of the invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatuses (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

What is claimed is:

1. A method for cluster augmentation of search results comprising:
utilizing at least one processor to execute computer code configured to perform the steps of:
clustering a plurality of nodes representing a document belonging to a community within a network via:
identifying one or more communities comprising clusters of documents linked together within the network, wherein the one or more communities are identified based on connectivity among nodes within the network;
wherein said identifying comprises identifying one or more clusters based on a user definable connectivity factor by performing the steps of:
generating a connectivity context for each of the plurality of nodes, the connectivity context including a set of features, wherein a feature is selected from the group consisting of inlinks and outlinks and wherein the set of features comprises an ordered list of features;
generating a feature vector for the set of features for each of the plurality of nodes; and
ordering the feature vectors;
determining one or more key terms from the ordered feature vectors to define the one or more clusters, wherein the one or more key terms comprise a topic associated with the one or more clusters and wherein the determining one or more key terms comprises extracting text from the one or more documents included in the one or more documents and identifying a predetermined number of key terms having a frequency occurrence above a predetermined a frequency by performing a frequency analysis on the extracted text and filtering irrelevant elements from the extracted text using a text-mining technique; and
removing hubs and authorities based on the user definable connectivity factor to size the one or more clusters to a predetermined size based on the connectivity of the node remaining after removal of the hubs and authorities;

receiving, responsive to the clustering, a query including one or more search terms; and returning one or more results in response to the query, including one or more clusters having one or more key terms corresponding to the one or more search terms.

2. The method according to claim 1, further comprising selecting one or more advertisements for the one or more clusters, wherein the one or more results include one or more advertisements.

3. The method according to claim 2, wherein the one or more advertisements are selected according to the one or more key terms for the one or more clusters.

4. The method according to claim 1, wherein the user definable connectivity factor establishes an amount of type one nodes to be removed from a network graph in determining connectivity among the plurality of nodes, the type one nodes comprising one or more of hubs and authorities.

5. The method according to claim 1, wherein the network comprises a social network, and further wherein the plurality of nodes comprise a plurality of web pages.

6. The method according to claim 5, wherein the connectivity among the plurality of nodes is established by one or more hyperlinks between two or more web pages.

7. The method according to claim 1, wherein determining one or more key terms for the one or more clusters further comprises analyzing text of the plurality of nodes to determine the one or more key terms.

8. The method according to claim 7, further comprising:
associating one or more topics for the one or more clusters based on the one or more key terms; and
associating one or more advertisements with the one or more clusters based on the one or more topics.

9. A computer program product for cluster augmentation of search results comprising:
a non-transitory computer readable storage medium having computer readable program code embodied therewith, the computer readable program code comprising:
computer readable program code configured to cluster a plurality of nodes representing a document belonging to a community within a network via:
identifying one or more communities comprising clusters of documents linked together within the network, wherein the one or more communities are identified based on connectivity among nodes within the network;
wherein the identifying comprises identifying one or more clusters based on a user definable connectivity factor by performing the steps of:
generating a connectivity context for each of the plurality of nodes, the connectivity context including a set of features, wherein a feature is selected from the group consisting of inlinks and outlinks and wherein the set of features comprises an ordered list of features;
generating a feature vector for the set of features for each of the plurality of nodes; and
ordering the feature vectors;
determining one or more key terms from the ordered feature vectors to define the one or more clusters, wherein the one or more key terms comprise a topic associated with the one or more clusters and wherein the determining one or more key terms comprises extracting text from the one or more documents included in the one or more documents and identifying a predetermined number of key terms having a frequency occurrence above a predetermined threshold by performing a frequency analysis on the extracted text and filtering irrelevant elements from the extracted text using a text-mining technique; and
removing hubs and authorities based on the user definable connectivity factor to size the one or more clusters to a predetermined size based on the connectivity of the node remaining after removal of the hubs and authorities;
computer readable program code configured to receive, responsive to the clustering, a query including one or more search terms; and
computer readable program code configured to return one or more results in response to the query, including one or more clusters having one or more key terms corresponding to the one or more search terms.

10. The computer program product according to claim 9, further comprising computer readable program code configured to select one or more advertisements for the one or more clusters, wherein the one or more results include one or more advertisements.

11. The computer program product according to claim 10, wherein the one or more advertisements are selected according to the one or more key terms for the one or more clusters.

12. The computer program product according to claim 9, wherein the user definable connectivity factor establishes an amount of type one nodes to be removed from a network graph in determining connectivity among the plurality of nodes, the type one nodes comprising one or more of hubs and authorities.

13. The computer program product according to claim 9, wherein the network comprises a social network, and further wherein the plurality of nodes comprise a plurality of web pages.

14. The computer program product according to claim 13, wherein the connectivity among the plurality of nodes is established by one or more hyperlinks between two or more web pages.

15. The computer program product according to claim 9, wherein to determine one or more key terms for the one or more clusters further comprises analyzing text of the plurality of nodes to determine the one or more key terms.

16. The computer program product according to claim 15, further comprising computer readable program code configured to:
associate one or more topics for the one or more clusters based on the one or more key terms; and
associate one or more advertisements with the one or more clusters based on the one or more topics.

17. A system for cluster augmentation of search results comprising:
one or more processors; and
a memory operatively connected to the one or more processors;
wherein, responsive to execution of computer readable program code accessible to the one or more processors, the one or more processors are configured to:
cluster a plurality of nodes representing a document belonging to a community within a network via:
identifying one or more communities comprising clusters of documents linked together within the network, wherein the one or more communities are identified based on connectivity among nodes within the network;
wherein the identifying comprises identifying one or more clusters based on a user definable connectivity factor by performing the steps of:

generating a connectivity context for each of the plurality of nodes, the connectivity context including a set of features, wherein a feature is selected from the group consisting of inlinks and outlinks and wherein the set of features comprises an ordered list of features;

generating a feature vector for the set of features for each of the plurality of nodes; and ordering the feature vectors;

determining one or more key terms from the ordered feature vectors to define the one or more clusters, wherein the one or more key terms comprise a topic associated with the one or more clusters and wherein the determining one or more key terms comprises extracting text from the one or more documents included in the one or more documents and identifying a predetermined number of key terms having a frequency occurrence above a predetermined threshold by performing a frequency analysis on the extracted text and filtering irrelevant elements from the extracted text using a text-mining technique; and removing hubs and authorities based on the user definable connectivity factor to size the one or more clusters to a predetermined size based on the connectivity of the node remaining after removal of the hubs and authorities;

receive, responsive to the clustering, a query including one or more search terms; and return one or more results in response to the query, including one or more clusters having one or more key terms corresponding to the one or more search terms.

18. The system according to claim 17, wherein the one or more processors are further configured to select one or more advertisements for the one or more clusters, and further wherein the one or more results include one or more advertisements.

* * * * *